United States Patent [19]

Wu

[11] Patent Number: 5,140,251
[45] Date of Patent: Aug. 18, 1992

[54] DEVICE FOR MONITORING THE CHARGING OF A BATTERY

[76] Inventor: Ko-lee Wu, 3F, 5, Lane 26, chien-kong, Street, Taipei 11154, Taiwan

[21] Appl. No.: 571,773

[22] Filed: Aug. 22, 1990

[51] Int. Cl.$^5$ ............................................. H02J 7/00
[52] U.S. Cl. ...................................... 320/31; 320/20; 320/44
[58] Field of Search ................... 320/20, 44, 40, 48, 320/31

[56] References Cited

U.S. PATENT DOCUMENTS

| | | | |
|---|---|---|---|
| 3,938,021 | 2/1976 | Kosmin | 320/40 |
| 4,034,279 | 7/1977 | Nilsson | 320/20 |
| 4,118,661 | 10/1978 | Siekierski et al. | 320/40 |
| 4,392,101 | 7/1983 | Saar et al. | 320/20 |
| 4,471,286 | 9/1984 | Heinrich et al. | 322/29 |
| 4,709,202 | 11/1987 | Koenck et al. | 320/48 X |

Primary Examiner—R. J. Hickey
Attorney, Agent, or Firm—McGlew & Tuttle

[57] ABSTRACT

To prevent over charging of a battery the battery voltage is detected during charging and when a decrease in voltage, which occurs just after full charge, is detected the charger is switched off. The battery voltage may be monitored by a dual slope integrator 30 and a central processor 10 indicates the status of the battery on a display 50. During discharge the voltage drop across a resistor R connected between the battery and load is monitored by integrators 30, 40 and processor 10.

9 Claims, 4 Drawing Sheets

DEVICE FOR MONITORING THE CHARGING OF A BATTERY

FIELD OF THE INVENTION

The present invention relates to a device for monitoring the charging of a rechargeable battery. The invention also relates to means for displaying the capacity of a rechargeable battery during use and during charging and discharging so that the user can monitor the state of the battery.

BACKGROUND OF THE INVENTION

Many electronic devices using a battery power supply are being developed such as portable computers, mobile telephones, electronic cameras, etc. Such appliances need to be light weight and use little power. It is known however, that long term usage of rechargeable batteries gives rise to various problems.

Firstly, there is no way for the user to tell how much capacity is left in the rechargeable battery during use. He can only speculate on the time when recharging is required and for how long recharging is needed. If the user fails to judge correctly when the batteries need to be recharged the loss of capacity may only become apparent in the middle of operating the appliance. This may be especially inconvenient when the battery is a heavy weight or large volume device such that a spare battery is not carried when operating the appliance outdoors.

As a consequence, an important picture or news item might be missed in the case of batteries failing in a portable camera, or a portable computer might fail during running, or the conversation on a mobile telephone might be interrupted, etc.

Secondly, during charging of a battery, there is no way of knowing whether the capacity of the battery has been saturated, particularly since the time taken for saturated charging may vary depending on the structure of the charger and many different chargers are available. As a result, the user may not know when the battery is actually fully re-charged.

Thirdly, in the case of fast recharging batteries that are recharged within a short time, speculation or guess work on the part of the user might easily lead to overcharging and even to damaging of the batteries. It is possible, for example, for there to be 50% of the capacity left at the start of recharging, so the risks of either inadequate or over-saturated re-charging still exist.

SUMMARY AND OBJECTS OF THE INVENTION

In an effort to overcome the above-noted problems, the present invention aims to provide a means for controlling the recharging of a battery and a means for monitoring and displaying the capacity of a rechargeable battery. In this way the capacity of the battery can be directly observed to determine if re-charging is required and since the state of charging can be clearly observed, there will be less likelihood of inadequate or over-saturated re-charging.

A particular aim of the present invention is to provide the means by which the battery is brought to maximum charge capacity and, further, over-charging is prevented. This may be done by detecting a small voltage drop (a negative delta voltage) during charging and immediately intercepting and preventing further charging when the battery is fully saturated.

A further aim of the present invention is to provide means for displaying the capacity of a rechargeable battery, using a central processor to detect when the batteries are neither recharging nor discharging, the central processor going into a quiescent condition for power saving purposes while the processor can be called at all times to detect the current flow within the battery.

According to the present invention there is provided a device for monitoring the charging of a rechargeable battery, the device comprising means for detecting the battery voltage during charging, means for determining when the battery voltage falls during charging, the fall indicating charge saturation, and means for generating a signal to terminate charging when a fall in battery voltage is detected.

Other preferred features and advantages of the invention will be apparent from the following detailed description and the accompanying claims.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE DRAWINGS

Figure 1:
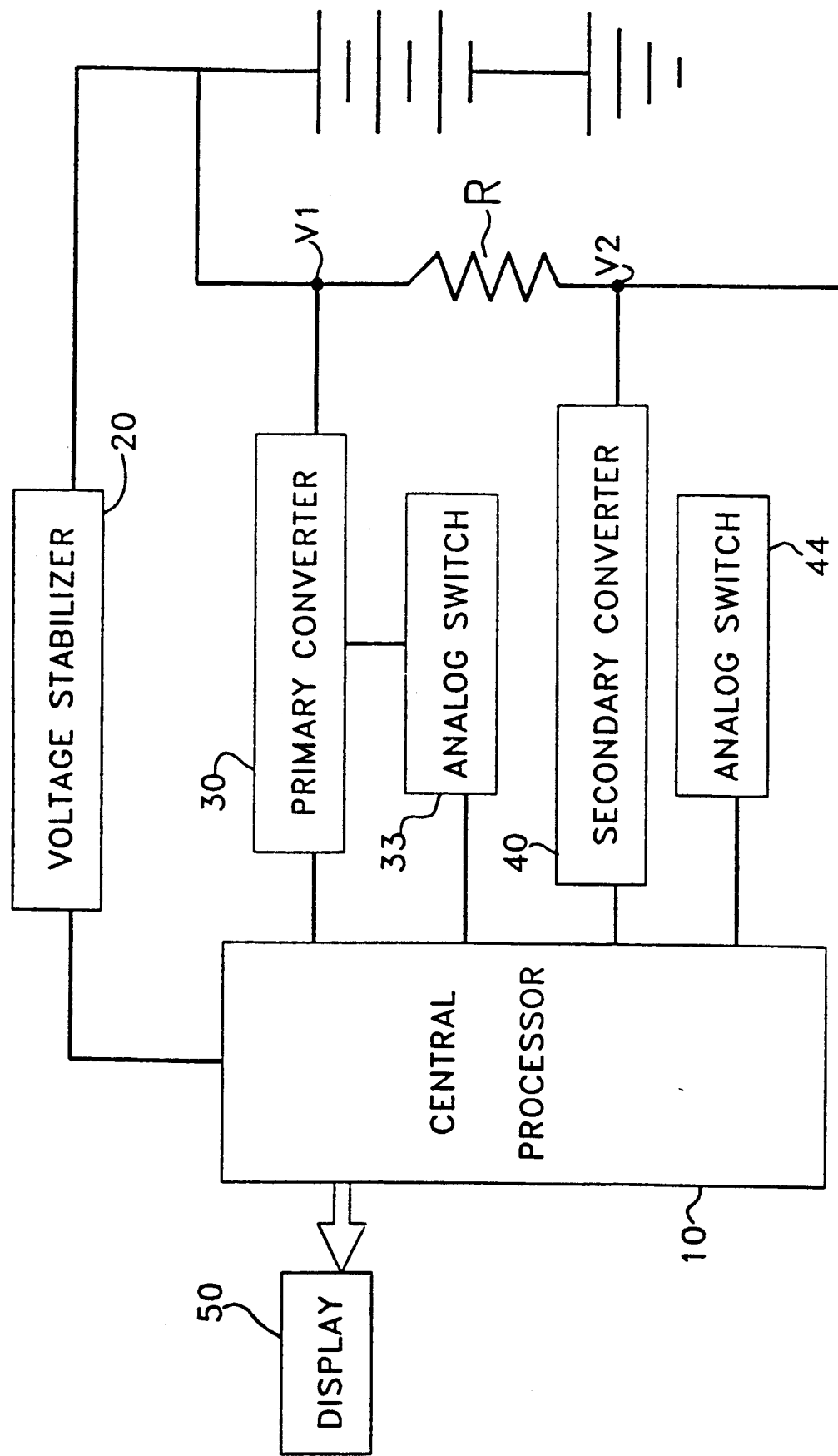
FIG. 1 is a block diagram of a battery capacity monitoring and display device forming an embodiment of the present invention.

Referring now to the drawings and specifically to FIG. 1, the device for monitoring and displaying the capacity of a re-chargeable battery comprises a central processor 10, with input terminals connected respectively to a voltage stabilizer 20, a primary converter 30 and a secondary converter 40, and output terminals connected to a cell capacity display monitor 50 (preferably an LCD). Between the primary converter 30 and secondary converter 40 there is connected a current measurement diverter R having a terminal A for connection to the positive electrode of a battery and a terminal B for connection to the battery load or to the positive electrode of the charger; the battery or charger being connected to a ground. The primary and secondary converters 30, 40 are respectively connected to voltage test starting switches 33, 44 controlled by the central processor 10. The voltage stabilizer 20 provides a stabilized power supply which supplies power to the entire circuit, i.e. to the central processor 10, the primary and secondary converters 30 and 40 (typically analog to digital converters) and the capacity indicator 50.

Figure 2:
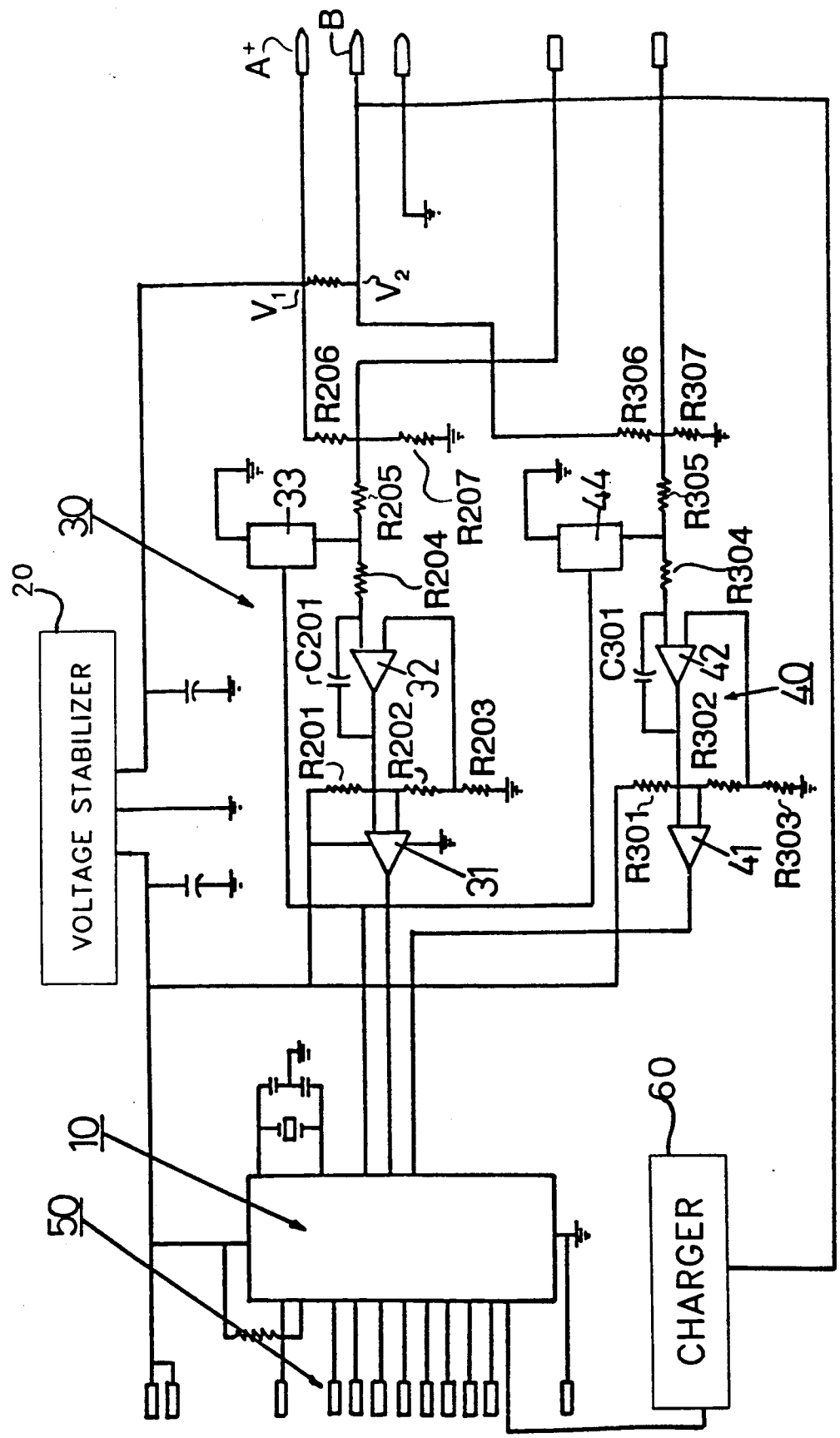
FIG. 2 is a circuit diagram for the embodiment of FIG. 1.

Referring now to the circuit diagram in FIG. 2, the primary converter 30 comprises operational amplifiers 31, 32, resistors R201, R202, R203, R204, R205, R206, R207 and capacitor C201 arranged as in the diagram. Similarily, the secondary converter 40 comprises operational amplifiers 41, 42, resistors R301, R302, R303, R304, R305, R306, R307 and capacitor C301. The application of a dual slope integration analog to digital converter technique in a measuring instrument is generally known and high accuracy can be obtained in voltage measurement.

In the diagram, the diverter R is a precision resistor having its ends connected respectively to the positive electrode of the battery and to the load of the battery. It will be appreciated that the battery may comprise a single cell, but typically comprises several. When the battery is charging or discharging, the current I flowing through R can be computed by the central processor 10 from voltages V1 and V2 at the ends of the resistor, measured respectively by the primary converter 30 and the secondary converter 40, using the formula:

$$I = V1 - V2/R.$$

The value calculated is transmitted from the 6th to 13th output terminals of the processor 10 to the monitor 50 which displays the computed capacity and when I is greater than 0 indicates that the cell is discharging or when I is less than 0, indicates the cell is charging.

To measure V1, the first terminal voltage of diverter R, the 1st terminal of the central processor 10 is set low to control terminal 13 of analog switch 33, so that both terminals 1 and 2 of switch 33 are in the OFF position, thus both terminals A and B of switch 33 are close to the state of open circuit (OFF). The terminal voltage from diverter R charges the capacitor C201 after being divided by resistance R206, R207, and flowing through resistance R204, R205, to give logic 0 at the output terminal 7 of the operational amplifier 32. The operational amplifier 31 inverts the output so the logic signal measured at terminal 17 of the central processor 10 is high (1). A high electric potential is then set at terminal 1 of the central process controller 10 to create a closed circuit (i.e. switch ON) terminals 1 and 2 of switch 33 thus both ends A and B of switch 33 are close to a short circuit, the switch is ON. At this time, the output logic at the comparator 32 goes high causing a low electric potential at terminal 1 of central processor 10 which switches A and B of switch 33 to open circuit (OFF) and the first counter (not shown in the diagram) in the central processor 10 starts counting until the output of operational amplifier 31 returns to logic 0, when the 1st counter stops counting. The count is thus indicative of voltage V1.

Similarly, to measure the second terminal voltage V2 of diverter R by the central processor controller, the 1st terminal of the processor is set at low electric potential, making terminal 12 of switch 44 low and switch 44 is then an open circuit (OFF), A and B at switch 44 being close to open circuit. The terminal voltage charges C301 after having been differentiated by resistance R306, R307 and flowing through R304 and R305. When the output terminal 14 of the operational amplifier 42 goes low, it is inverted by the operational amplifier 41, and the logic at the terminal 18 of the central processor is high, and terminal 1 of central processor 10 is set at high turning ON switch 44, therefore both terminals A and B of switch 44 are ON (short circuit). The output logic of the operational amplifier goes high and the terminal 1 of central processor 10 is set low so that both terminals A and B of the switch 44 10 are open circuit and a 2nd counter (not shown in the diagram) starts logic counting until the outputs from the operational amplifiers are inverted, when the 2nd counter stops counting. The count is thus indicative of voltage V2.

Thus, the central processor activates analog switches 33 and 44, and starts two counters, to give two values for computing the current to or from the charging or discharging battery, and further to produce a value for the cell capacity, by integration of the current which is passed through the output terminal and sent to the monitor 50 for display.

Figure 4:
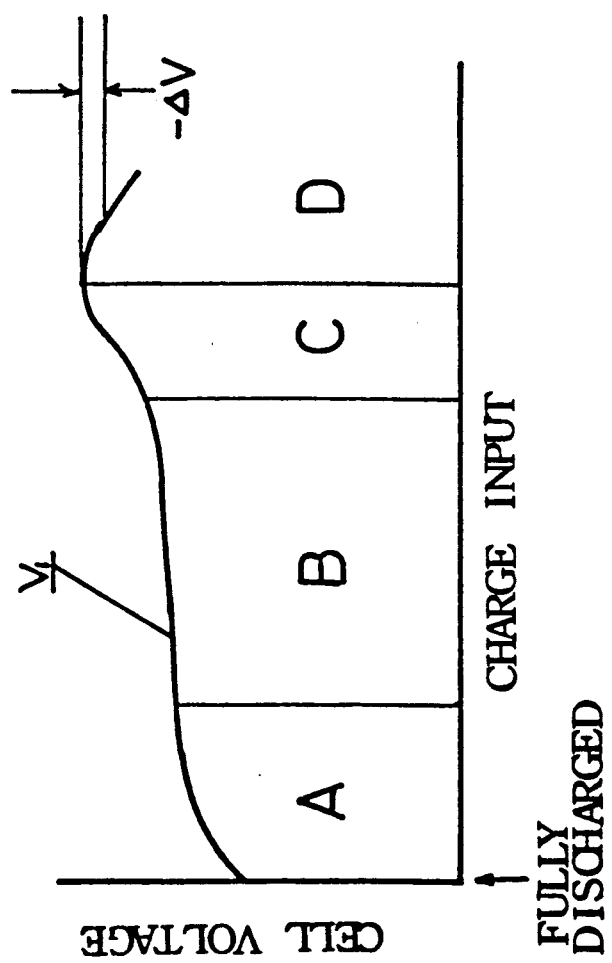
FIG. 4 is a curve chart illustrating the variation in capacity of a battery during charging.

The present invention is able to control charging of the battery by stopping recharging once the battery is saturated. Referring to the charging curve chart in FIG. 4, the area below the curve V1 indicates the state of battery voltage. The peak in the curve in area C indicates where the cell is charged to its saturation point. The present invention features a negative delta voltage $(-\Delta V)$, as indicated in FIG. 4, which is created when the voltage of the charging battery reaches it maximum voltage, this is the control point for terminating charging. When the cell is charged to reach area D in FIG. 4, the cell begins to become overcharged and the voltage will start to fall, i.e. the value of $dV/dt$ is negative and this signal is measured as the battery voltage V1 by the first converter 30. The signal indicative of the battery voltage change during charging is input through the 17th terminal into the central processor 10, which detects when a negative delta voltage occurs, and a signal is then transmitted from the 2nd terminal to notify the remote connected battery charger 60 to stop further charging of the battery.

One thing to be noted is that while the battery is discharging, there will be slight error between the capacity displayed by the monitor 50 and the material capacity of the battery however, once the battery is completely saturated on re-charging (100% is displayed at the monitor 50), the central processor 10 completes a correction for the capacity of the battery when fully charged, and so the error can be minimized.

A timer can be disposed within the central processor 10 to save power. The timer calls the central processor 10 to detect the cell current. If the current is other than 0 this indicates that the cell is either charging or discharging and the central process controller 10 is operating; if no current is detected, the cell is neither charging nor discharging, and the central process controller 10 enters a sleeping (or off) state, the entire circuit is turned off so as power is no longer consumed. Thus power saving is achieved.

Figure 3:
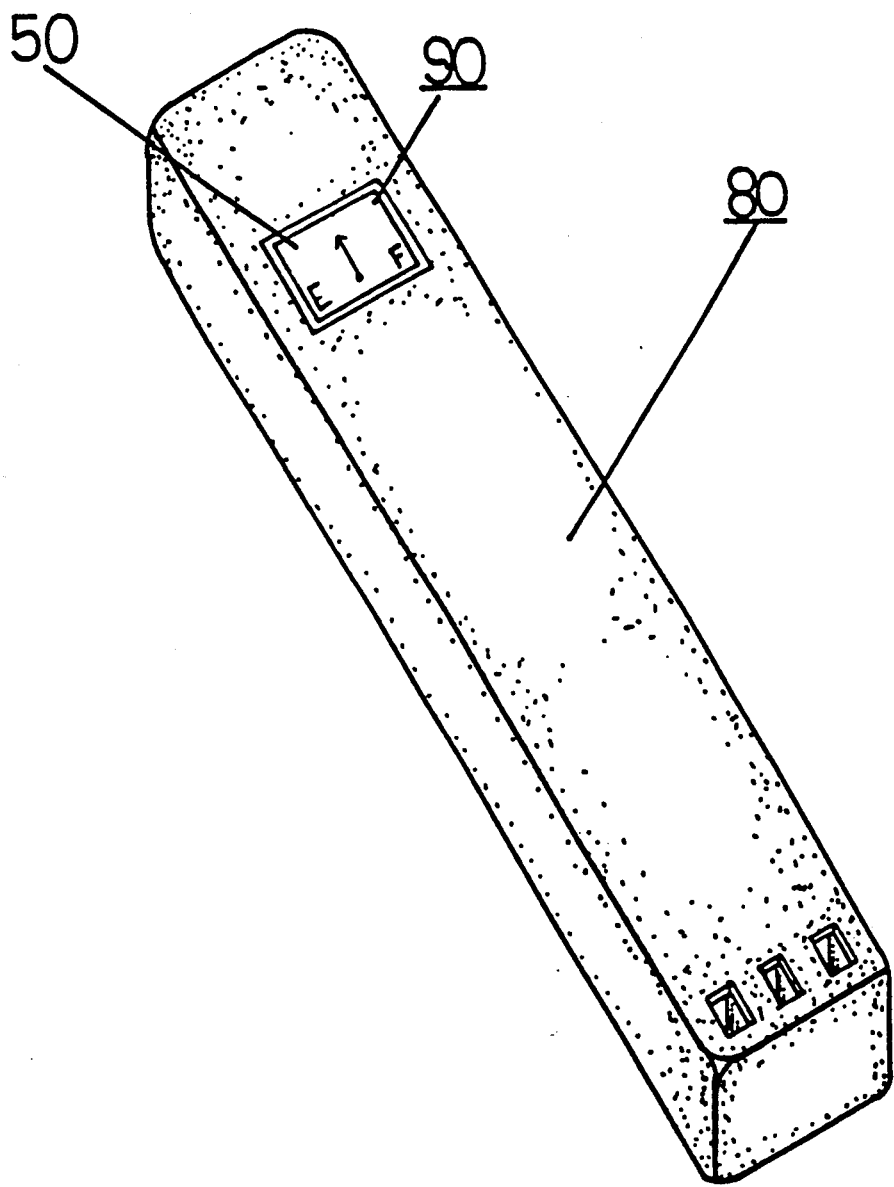
FIG. 3 is a perspective view of a casing for batteries arranged in accordance with the present invention.

FIG. 3 shows a casing 80 for housing the circuitry of the invention, with a display window 90 for the LCD 50, and sockets for connection to a load or charger.

Various modifications may be made to the described embodiment and it is desired to include such modifications as fall within the scope of the invention.

I claim:

1. A device for monitoring and controlling the charging of a rechargeable battery, the device comprising:
    a precision resistor of known value having a first end connected to one terminal of the rechargeable battery and having a second end connectable to a load;
    charging means, connected to said second end of said precision resistor, for supplying current to the rechargeable battery;
    current sensing means for determining direction of current through said precision resistor to determine if current is flowing into or out of the rechargeable battery;

voltage sensing means for measuring voltage at said one terminal of the rechargeable battery; and overcharge sensing means for monitoring said voltage sensing means when said precision resistor has current flowing into the rechargeable battery and said overcharging sensing means generating an overcharge signal when said voltage at said one of terminal of the rechargeable battery decreases.

2. A device in accordance with claim 1, further comprising:

another voltage sensing means for measuring another voltage at said second end of said precision resistor; and said current sensing means determining that said current in said precision resistor is flowing out of the rechargeable battery when said voltage at said one terminal of the rechargeable battery is higher than said another voltage at said second end of said precision resistor, and said current in said precision resistor is flowing into the rechargeable battery when said voltage at said one terminal of the rechargeable battery is lower than said another voltage at said second end of said precision resistor.

3. A device in accordance with claim 2, wherein:

said current sensing means has a central processing unit for sensing said current in said precision resistor.

4. A device in accordance with claim 2, wherein:
said voltage sensing means and said another voltage sensing means are dual slope integration analog to digital inverters.

5. A device in accordance with claim 1, further comprising:

a housing containing said precision resistors, said current sensing means, said voltage sensing means, said overcharging means, the rechargeable battery, a display means for displaying a state of charge of the rechargeable battery, a first set of terminals for connection to said load and a second set of terminals for connection to said charging means.

6. A device in accordance with 1, wherein:

said current sensing means also determining a magnitude of said current flowing through said precision resistor to produce a value for capacity of the rechargeable battery.

7. A device in accordance with claim 6, wherein:

said current sensing means produces said value of capacity by integration of said magnitude and direction of said current flowing through said resistor.

8. A device in accordance with claim 7, wherein:

a value determined from said integration is added to a value of existing capacity of the rechargeable battery.

9. A device in accordance with claim 7, wherein:

said capacity of the rechargeable battery is compensated to a predetermined value when said overcharge signal is generated.

* * * * *